United States Patent
Chen (10) Patent No.: US 11,372,485 B2
(45) Date of Patent: Jun. 28, 2022

(54) MOUSE

(71) Applicant: Chicony Electronics Co., Ltd., New Taipei (TW)

(72) Inventor: Tao Kuan Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/331,640

(22) Filed: May 27, 2021

(65) Prior Publication Data

US 2022/0171473 A1 Jun. 2, 2022

(30) Foreign Application Priority Data

Nov. 27, 2020 (TW) .................................. 109141745

(51) Int. Cl.
*G06F 3/0354* (2013.01)
*G06F 3/0362* (2013.01)

(52) U.S. Cl.
CPC ........ *G06F 3/03543* (2013.01); *G06F 3/0362* (2013.01)

(58) Field of Classification Search
CPC ............................ G06F 3/03543; G06F 3/0362
See application file for complete search history.

(56) References Cited

U.S. PATENT DOCUMENTS

| | | | | |
|---|---|---|---|---|
| 6,492,976 B1* | 12/2002 | Wang | ..................... | G06F 3/0312 250/231.13 |
| 8,687,060 B1* | 4/2014 | Wolff | ..................... | G06F 3/0304 348/140 |
| 2004/0174336 A1* | 9/2004 | Bohn | ..................... | G06F 3/0312 345/156 |
| 2007/0097075 A1* | 5/2007 | Wang | ..................... | G05G 9/047 345/163 |
| 2010/0085306 A1* | 4/2010 | Wu | ..................... | G06F 3/03543 345/163 |
| 2010/0156792 A1* | 6/2010 | Chou | ..................... | G06F 3/0362 345/163 |
| 2019/0121452 A1* | 4/2019 | Hsueh | ................. | G06F 3/03543 |
| 2020/0005977 A1* | 1/2020 | Keltz | .................. | G06F 3/03543 |
| 2021/0041963 A1* | 2/2021 | Fukumoto | ............ | G06F 3/0362 |
| 2021/0342016 A1* | 11/2021 | Yao | ..................... | G06F 3/03541 |

FOREIGN PATENT DOCUMENTS

| | | |
|---|---|---|
| CN | 206515794 | 9/2017 |
| TW | M561840 | 6/2018 |

OTHER PUBLICATIONS

Office Action of Taiwan Counterpart Application, dated Nov. 5, 2021, pp. 1-10.

* cited by examiner

*Primary Examiner* — Ariel A Balaoing
(74) *Attorney, Agent, or Firm* — JCIPRNET (57) ABSTRACT

A mouse, including a mouse body and a wheel module, is provided. The wheel module includes a first wheel, a second wheel and an axle connecting assembly. The first wheel has a first axle portion, the second wheel has a second axle portion, and the first wheel and the second wheel are respectively rotatably disposed on the mouse body along a same axis of rotation by the first axle portion and the second axle portion. The axle connecting assembly is connected to and in between the first axle portion and the second axle portion, and the first axle portion and the second axle portion rotate relative to each other by the axle connecting assembly.

19 Claims, 10 Drawing Sheets

MOUSE

CROSS-REFERENCE TO RELATED APPLICATION

This application claims the priority benefit of Taiwan application serial no. 109141745, filed on Nov. 27, 2020. The entirety of the above-mentioned patent application is hereby incorporated by reference herein and made a part of this specification.

BACKGROUND

Technical Field

This disclosure relates to mouse, and in particular to a mouse that includes double wheels.

Description of Related Art

The mouse is one of the most common computer peripheral products, and it has functions such as controlling movement of a cursor in a computer operating screen and clicking on information and objects in the screen. The mouse is constantly being updated and designed to be multifunctional and easy to operate with development of computer operating systems and various applications. In general, the mouse has a wheel for a user to perform scrolling, so as to execute various corresponding functions in the computer operating screen. Most of the mice on the market today only have a single wheel, and the functions that the user can perform through the wheel are limited, therefore additional function keys have to be added to the mouse to provide the required functions. However, excessive function keys make the overall operation of the mouse less convenient and unintuitive.

SUMMARY

This disclosure provides a mouse, which is simple and intuitive to operate, and has good maneuverability.

The mouse of the disclosure includes a mouse body and a wheel module. The wheel module includes a first wheel, a second wheel and an axle connecting assembly. The first wheel has a first axle portion, the second wheel has a second axle portion, and the first wheel and the second wheel are respectively rotatably disposed on the mouse body along a same axis of rotation by the first axle portion and the second axle portion. The axle connecting assembly is connected to and in between the first axle portion to the second axle portion, and the first axle portion and the second axle portion rotate relative to each other by the axle connecting assembly.

In an embodiment of the disclosure, the axle connecting assembly is a bearing.

In an embodiment of the disclosure, the axle connecting assembly is a self-lubricating material.

In an embodiment of the disclosure, the axle connecting assembly is disposed around one of the first axle portion and the second axle portion, the other of the first axle portion and the second axle portion includes a hollow portion, and the hollow portion is sleeved on the axle connecting assembly.

In an embodiment of the disclosure, the first axle portion has a first pivot end and a second pivot end relative to each other, and the wheel module is rotatably connected to the mouse body by the first pivot end and the second pivot end.

In an embodiment of the disclosure, the first axle portion has a first pivot end, the second axle portion has a second pivot end relative to the first pivot end, and the wheel module is rotatably connected to the mouse body by the first pivot end and the second pivot end.

In an embodiment of the disclosure, the first wheel has a first wheel portion, the second wheel has a second wheel portion, the first wheel portion and the second wheel portion form an accommodation space together, and the first axle portion and the second axle portion are respectively connected to the first wheel portion and the second wheel portion and are at least partially located in the accommodation space.

In an embodiment of the disclosure, the first wheel has a first wheel portion, the second wheel has a second wheel portion, the first axle portion and the second axle portion are respectively connected to the first wheel portion and the second wheel portion, and the first wheel portion and the second wheel portion are sequentially arranged in a direction parallel to the axis of rotation.

In an embodiment of the disclosure, the first wheel has a first wheel portion, the second wheel has a second wheel portion, the first axle portion and the second axle portion are respectively connected to the first wheel portion and the second wheel portion, and the axle connecting assembly is aligned with the first wheel portion or the second wheel portion.

In an embodiment of the disclosure, the mouse body includes a main casing and a frame, the frame is disposed in the main casing, and at least one of the first axle portion and the second axle portion is rotatably connected to the frame.

In an embodiment of the disclosure, the frame is deflectably connected to the main casing.

In an embodiment of the disclosure, the mouse further includes an encoder, in which the encoder is disposed in the mouse body and connected to the first axle portion, and is suitable for detecting spinning of the first axle portion.

In an embodiment of the disclosure, the mouse further includes a non-contact sensor, in which the non-contact sensor is disposed in the mouse body and faces the second wheel, and is suitable for detecting spinning of the second wheel.

In an embodiment of the disclosure, the non-contact sensor is an optical sensor, the second wheel has multiple to-be-detected portions, and the to-be-detected portions are disposed around the axis of rotation to be suitable for sequentially aligning with the optical sensor with the spinning of the second wheel.

In an embodiment of the disclosure, the to-be-detected portions include multiple recessed portions.

In an embodiment of the disclosure, the non-contact sensor is a magnetic sensor, the second wheel has multiple magnetic portions, and the magnetic portions are disposed around the axis of rotation to be suitable for sequentially aligning with the magnetic sensor with the spinning of the second wheel.

In an embodiment of the disclosure, the magnetic portions include multiple permanent magnets.

In an embodiment of the disclosure, the mouse further includes a judgement unit, the judgement unit is disposed in the mouse body and coupled to the non-contact sensor, and the judgement unit determines that the spinning of the second wheel is an error when a spinning speed of the second wheel is detected by the non-contact sensor to be less than a predetermined value.

In an embodiment of the disclosure, the mouse further includes a supporting member, in which the supporting member is disposed in the mouse body and is suitable for supporting the first wheel in a radial direction of the axis of rotation.

In an embodiment of the disclosure, the supporting member includes an idler wheel, and the idler wheel is rotatably disposed in the mouse body.

Based on the above, the wheel module of the disclosure includes the first wheel and the second wheel, and is in the form of a double wheel. Therefore, compared to a conventional mouse with only a single wheel, the mouse of the disclosure can provide more diversified operational functions through its wheel module. In this way, there is no need to add additional function keys to provide the required functions. The user is able to operate the first wheel and the second wheel alternately with a single finger to perform various functions, enabling the operation of the mouse to be easy and intuitive. In addition, the axle connecting assembly is disposed between the first wheel and the second wheel that are coaxially disposed, which enables the first wheel and the second wheel to smoothly spin relative to each other. Therefore, any one of the first wheel and the second wheel is able to be operated independently without driving the other unexpectedly, thereby having good maneuverability.

To make the abovementioned more comprehensible, several embodiments accompanied by drawings are described in detail as follows.

DESCRIPTION OF THE EMBODIMENTS

Figure 1:
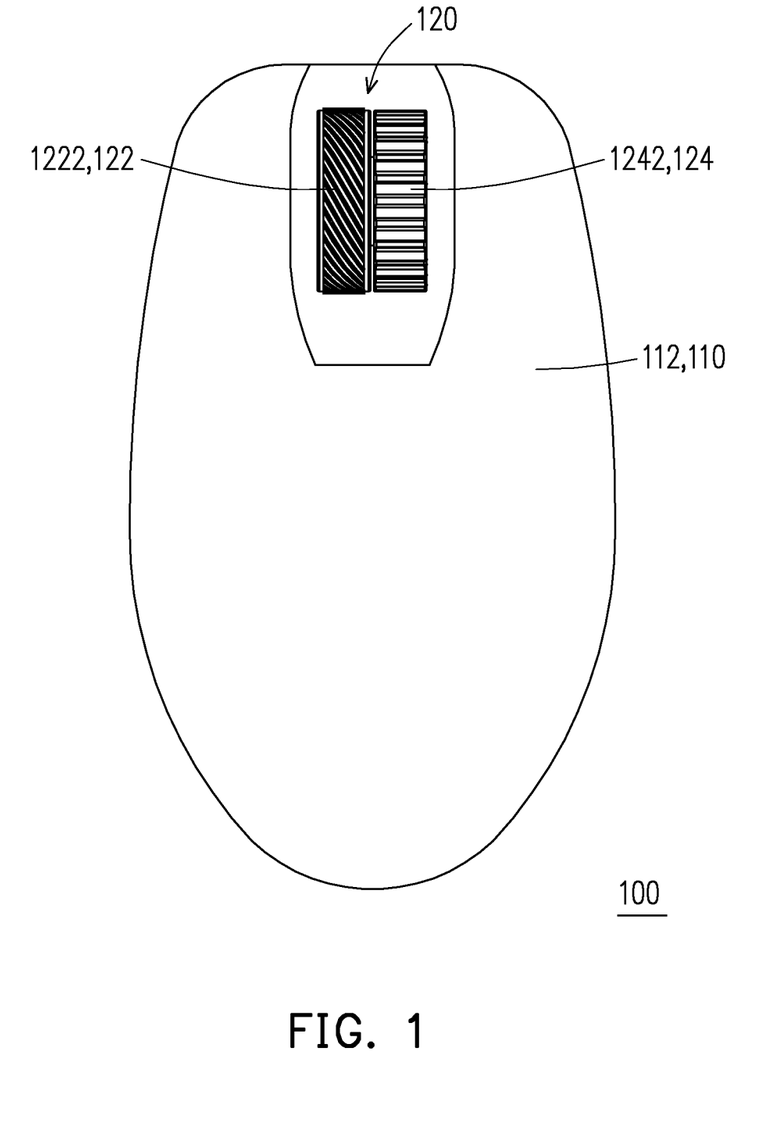
FIG. 1 is a top view of a mouse according to an embodiment of the disclosure.
Figure 2:
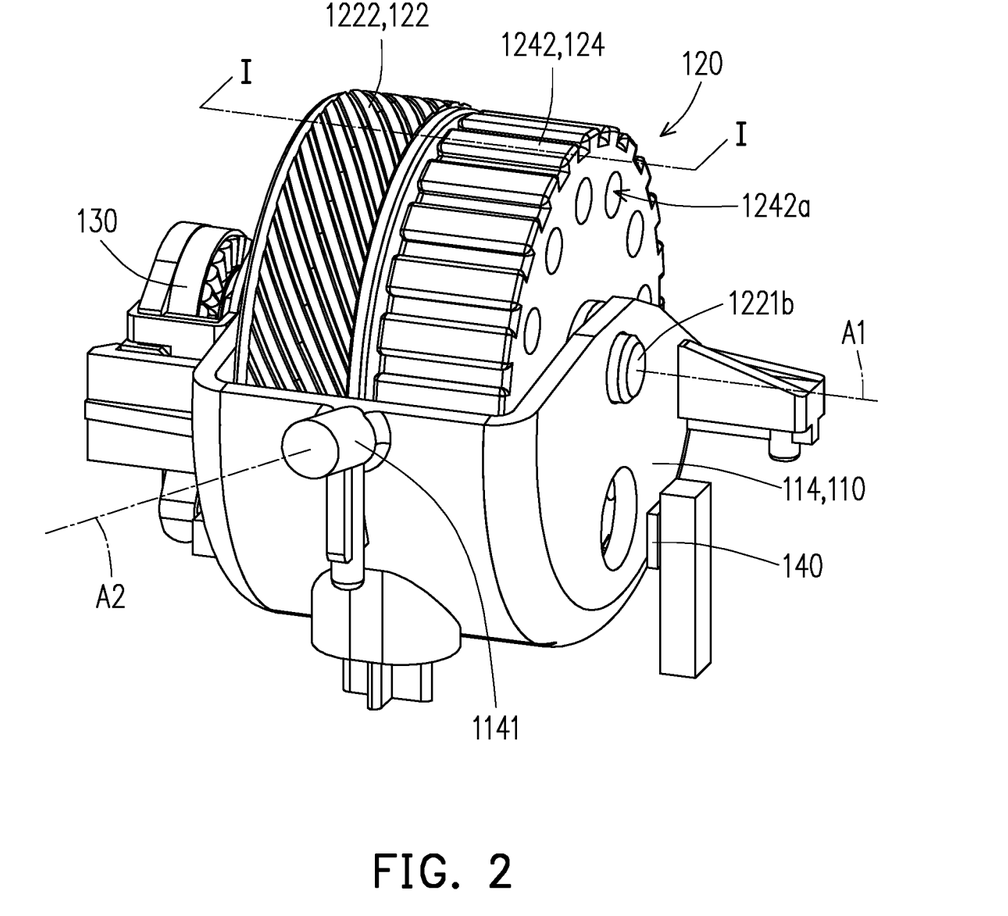
FIG. 2 is a perspective view of some components of the mouse in FIG. 1.

FIG. 1 is a top view of a mouse according to an embodiment of the disclosure. FIG. 2 is a perspective view of some components of the mouse in FIG. 1. With reference to FIGS. 1 and 2, a mouse 100 of the embodiment includes a mouse body 110 and a wheel module 120. The wheel module 120 includes a first wheel 122 and a second wheel 124. The first wheel 122 and the second wheel 124 are respectively rotatably disposed on the mouse body 110, so that the wheel module 120 is in the form of a double wheel.

In this configuration, compared to a conventional mouse with only a single wheel, the mouse 100 of the embodiment may provide more diversified operational functions through its wheel module 120. For example, the first wheel 122 and the second wheel 124 may be respectively configured to execute at least two of the following functions such as moving a window screen, zooming in and out on the screen, and adjusting the volume. Therefore, there is no need to add additional function keys to provide required functions. A user is able alternately operate the first wheel 122 and the second wheel 124 with a single finger to execute the various functions, enabling operation of the mouse 100 to be easy and intuitive.

In the embodiment, a material of the first wheel 122 may be plastic, and a material of the second wheel 124 may be metal, enabling the user to easily distinguish the two wheels by the different materials. In addition, the first wheel 122 and the second wheel 124 may respectively have different colors, or have a height difference due to a difference in outer diameter size, so as to help the user distinguish the two wheels.

Figure 3:
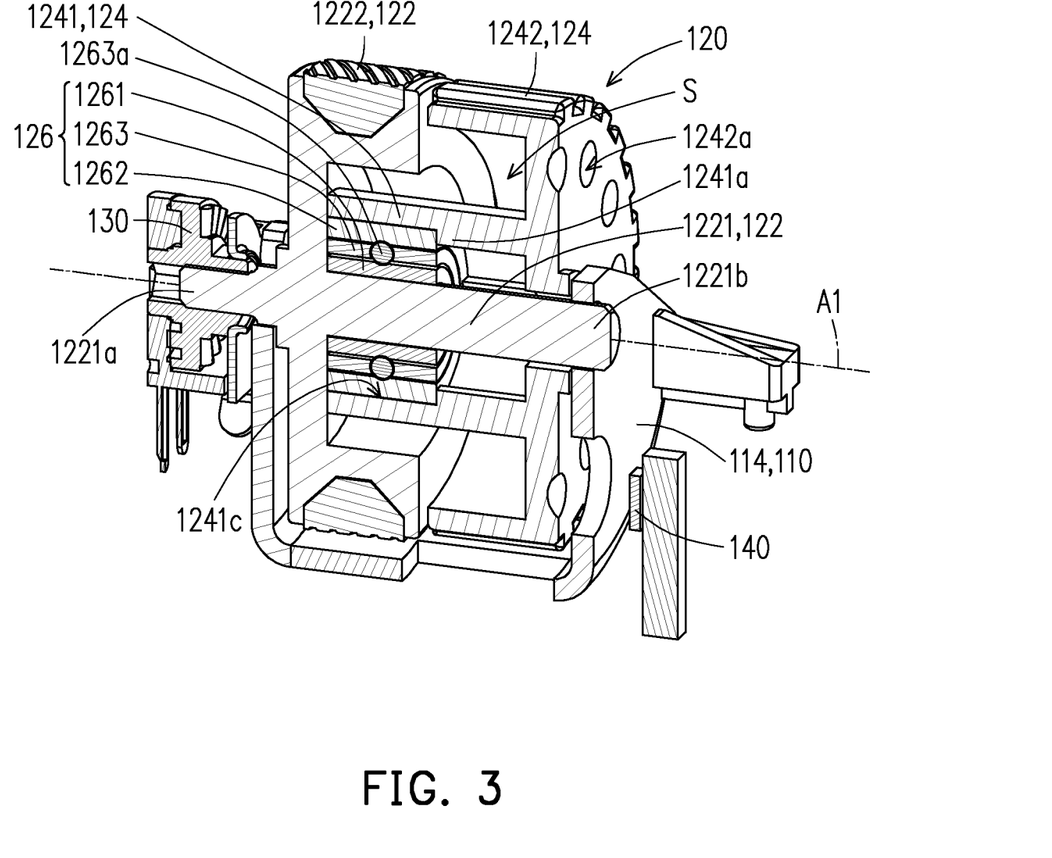
FIG. 3 is a cross-sectional view of the mouse in FIG. 2 along the line I-I.

FIG. 3 is a cross-sectional view of the mouse in FIG. 2 along the line I-I. With reference to FIG. 3, specifically, the first wheel 122 has a first axle portion 1221 and a first wheel portion 1222 connected to each other, and the second wheel 124 has a second axle portion 1241 and a second wheel portion 1242 connected to each other. The first wheel 122 and the second wheel 124 are respectively rotatably arranged on the mouse body 110 along a same axis of rotation A1 by the first axle portion 1221 and the second axle portion 1241. The user may apply force on the first wheel portion 1222 to enable the first wheel 122 to spin or apply force on the second wheel portion 1242 to enable the second wheel 124 to spin. In addition, the wheel module 120 further includes an axle connecting assembly 126. The axle connecting assembly 126 is, for example, a bearing, and is connected to and in between the first axle portion 1221 and the second axle portion 1241. The first axle portion 1221 and the second axle portion 1241 are suitable for rotating relative to each other by the axle connecting assembly 126. Specifically, the first axle portion 1221 is formed on an inner wall of the first wheel portion 1222, and extends from the inner wall through the axle connecting assembly 126 along the axis of rotation A1. The second axle portion 1241 is formed on an inner wall of the second wheel portion 1242 and extends from the inner wall along the axis of rotation A1. In addition, the second axle portion 1241 includes a stop structure 1241a and a hollow portion 1241c. The stop structure 1241a is connected to and in between an inner wall of the second wheel portion 1242 and the hollow portion 1241c. Thicknesses of the stop structure 1241a and the hollow portion 1241c are different, therefore forming a stepped groove structure. The stop structure 1241a stops the axle connecting assembly 126 at its position, and the hollow portion 1241c is sleeved on the axle connecting assembly 126. That is, in a radial direction of the axis of rotation A1, the first axle portion 1221, the axle connecting assembly 126, and the second axle portion 1241 are sequentially disposed from the inside to the outside.

The axle connecting assembly 126 is disposed between the coaxially disposed first wheel 122 and the second wheel 124, enabling the first wheel 122 and the second wheel 124 to smoothly spin relative to each other. Therefore, any one of the first wheel 122 and the second wheel 124 is able to be operated independently without driving the other unexpectedly, thereby having good maneuverability.

In the embodiment, the axle connecting assembly 126 is, for example, a ball bearing, which includes an inner layer structure 1261 connected to the first axle portion 1221, an outer layer structure 1262 connected to the second axle portion 1241, and a ball layer structure 1263 disposed between the inner layer structure 1261 and the outer layer structure 1262. The inner layer structure 1261 and the outer layer structure 1262 may slide relative to each other around the axis of rotation A1 by rolling of balls 1263a in the ball layer structure 1263, enabling the first axle portion 1221 and the second axle portion 1241 to rotate relative to each other along the axis of rotation A1. Specifically, the first axle portion 1221 and the inner layer structure 1261 connected to the first axle portion 1221 rotate together when the first wheel 122 is rotated. At this time, the inner layer structure 1261 may smoothly rotate without driving the outer layer structure 1262 by the rolling of the balls 1263a in the ball layer structure 1263, thereby causing the outer layer structure 1262 and the second axle portion 1241 connected to the outer layer structure 1262 to not rotate. On the contrary, the second axle portion 1241 and the outer layer structure 1262 connected to the second axle portion 1241 rotate together when the second wheel 124 is rotated. At this time, the outer layer structure 1262 may smoothly rotate without driving the inner layer structure 1261 by the rolling of the balls 1263a in the ball layer structure 1263, thereby causing the inner layer structure 1261 and the first axle portion 1221 connected to the inner layer structure 1261 to not rotate. Therefore, the second wheel 124 is not driven to rotate unexpectedly when the user operates the first wheel 122, and the first wheel 122 is not driven to rotate unexpectedly when the user operates the second wheel 124. In other embodiments, the axle connecting assembly 126 may be other types of bearings, or other appropriate forms of axle connecting assemblies, but the disclosure is not limited thereto.

With reference to FIG. 3, in more detail, the first wheel portion 1222 and the second wheel portion 1242 of the embodiment are sequentially arranged in a direction parallel to the axis of rotation A1 and close to each other, to allow the finger of the user to easily move from one of the first wheel portion 1222 and the second wheel portion 1242 to the other quickly. In addition, the first wheel portion 1222 and the second wheel portion 1242 form an accommodation space S together. At least a portion of the first axle portion 1221, at least a portion of the second axle portion 1241, and the axle connecting assembly 126 are located in the accommodation space S, which saves disposition space outside the first wheel portion 1222 and the second wheel portion 1242.

Figure 4:
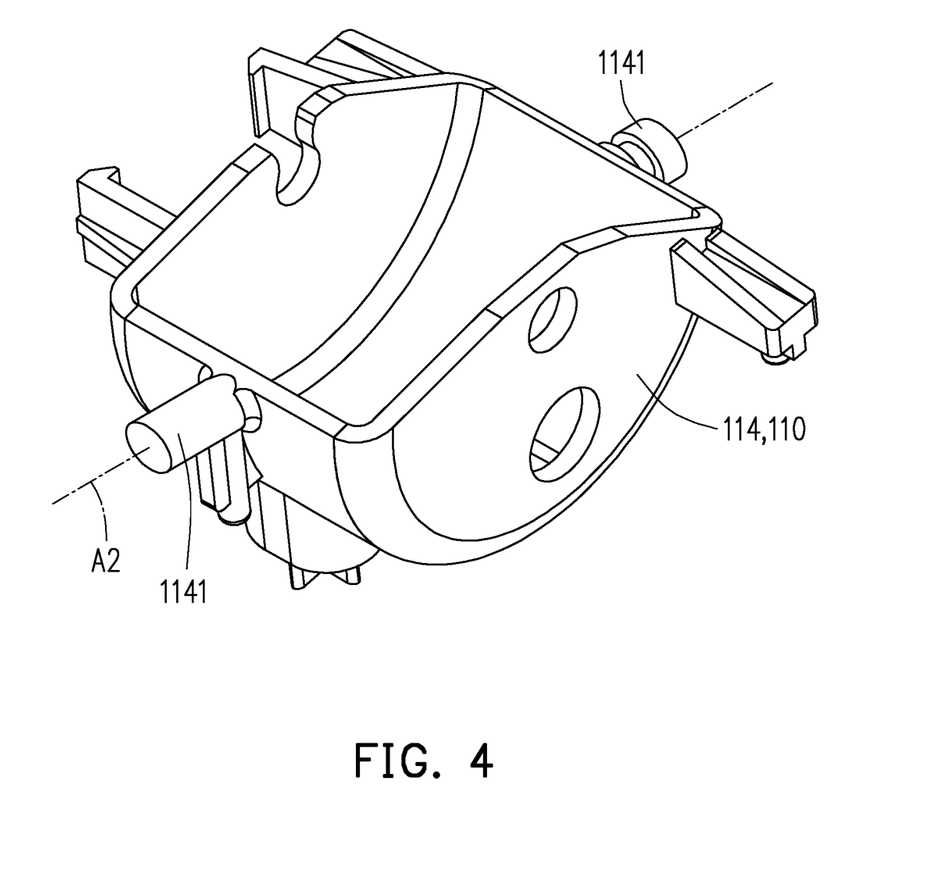
FIG. 4 is a perspective view of a frame in FIG. 2.

FIG. 4 is a perspective view of a frame in FIG. 2. In the embodiment, the mouse body 110 includes a main casing 112 (shown in FIG. 1) and a frame 114 (shown in FIGS. 2 to 4). The frame 114 is disposed in the main casing 112 and is configured to carry the wheel module 120. The wheel module 120 is, for example, rotatably connected to the frame 114 by its first axle portion 1221. Furthermore, the frame 114 of the embodiment is, for example, rotatably connected to the main casing 112 along another axis of rotation A2 by its shaft structure 1141, which enables the wheel module 120 to tilt with deflection of the frame 114, so as to improve flexibility and comfort of the user during operation of the wheel module 120. The axis of rotation A2 is, for example, substantially perpendicular to the axis of rotation A1. Furthermore, the wheel module 120 and the frame 114 may be integrated into a single module and then assembled with the main casing 112. This simplifies assembly of the mouse 100 and prevents excessive assembly tolerance caused by an overly complicated assembly process.

Figure 5:
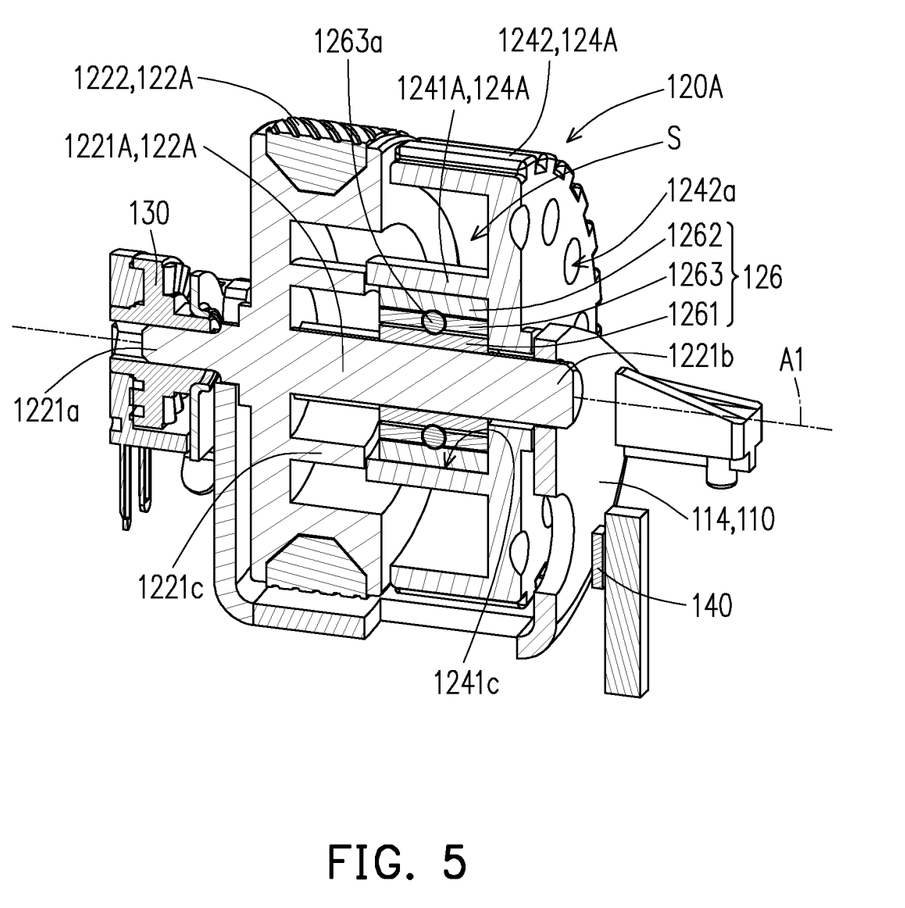
FIG. 5 is a cross-sectional view of a mouse according to another embodiment of the disclosure.

In the embodiment shown in FIG. 3, the axle connecting assembly 126 is disposed in alignment with the first wheel portion 1222. Correspondingly, the second axle portion 1241 is connected to the axle connecting assembly 126 by the stepped groove structure formed by the stop structure 1241a and the hollow portion 1241c as described above. However, the disclosure is not limited thereto. FIG. 5 is a cross-sectional view of a mouse according to another embodiment of the disclosure. A difference between the embodiment shown in FIG. 5 and the embodiment shown in FIG. 3 is that in a wheel module 120A of FIG. 5, instead of being aligned with the first wheel portion 1222 of a first wheel 122A, the axle connecting assembly 126 is aligned with the second wheel portion 1242 of a second wheel 124A. Correspondingly, compared to the embodiment shown in FIG. 3, a second axle portion 1241A of FIG. 5 does not include the stop structure 1241a shown in FIG. 3, and the hollow portion 1241c of the second axle portion 1241A directly extends from the inner wall of the second wheel portion 1242 to connect to the axle connecting assembly 126. That is, as compared to the second axle portion 1241 of FIG. 3, the second axle portion 1241A of FIG. 5 has a smaller extension length and may be connected to the axle connecting assembly 126. In addition, periphery of a first axle portion 1221A has a stop structure 1221c, and the stop structure 1221c partially overlaps the axle connecting assembly 126 in an axial direction (a direction parallel to the axis of rotation A1) of the axle connecting assembly 126, so as to stop the axle connecting assembly 126 at its position when the axle connecting assembly 126 unexpectedly separates from the hollow portion 1241c. There is, for example, a gap between the stop structure 1221c and the hollow portion 1241c in the embodiment, so as to prevent generation of resistance due to contact friction between the stop structure 1221c and the hollow portion 1241c when the first wheel 122A and the second wheel 124A rotate relative to each other. The axle connecting assembly 126 may be used to provide a good support for the second wheel 124 by disposing the axle connecting assembly 126 in alignment with the second wheel portion 1242, as shown in FIG. 5.

Figure 6:
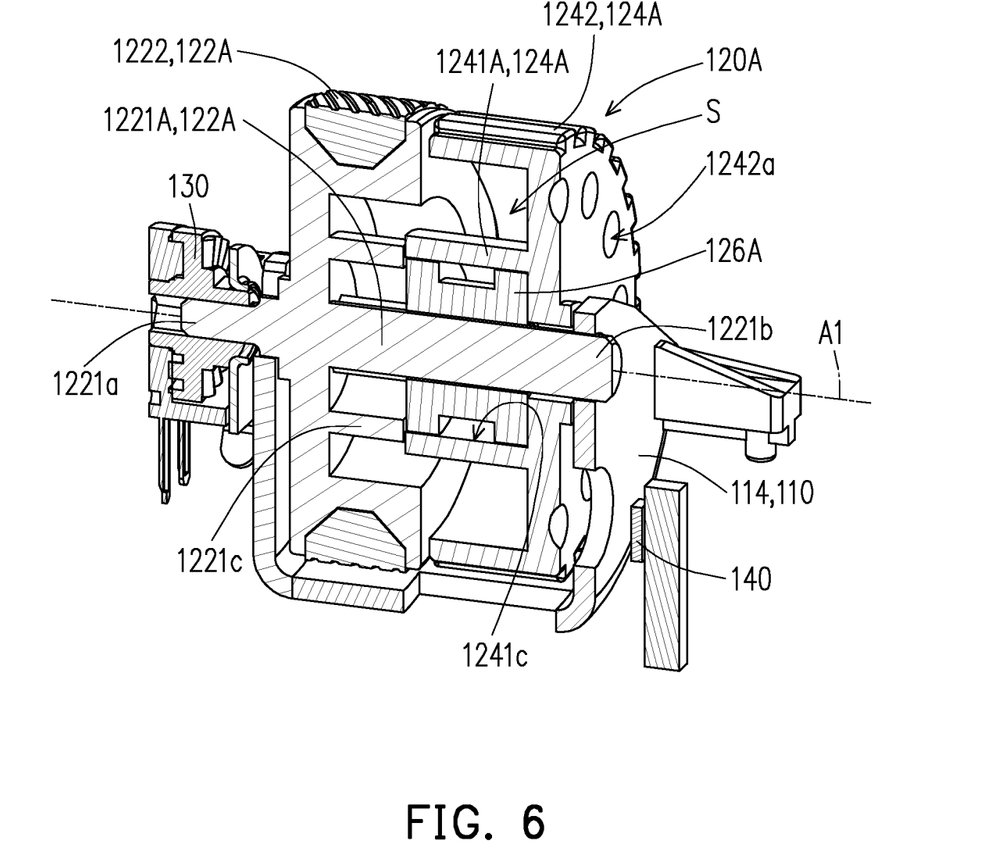
FIG. 6 is a cross-sectional view of a mouse according to another embodiment of the disclosure.

In the embodiment shown in FIG. 5, the axle connecting assembly 126 is the ball bearing, but the disclosure is not limited thereto. FIG. 6 is a cross-sectional view of a mouse according to another embodiment of the disclosure. A difference between the embodiment shown in FIG. 6 and the embodiment shown in FIG. 5 is that an axle connecting assembly 126A of FIG. 6 is a self-lubricating material, which may be in a form of a sleeve. The first axle portion 1221A may smoothly rotate without driving the second axle portion 1241A by a low frictional force of the self-lubricating material when the first wheel 122A is rotated. On the contrary, the second axle portion 1241A may smoothly rotate without driving the first axle portion 1221A by the low frictional force of the self-lubricating material when the second wheel 124A is rotated. Therefore, the second wheel 124A is not driven to rotate unexpectedly when the user operates the first wheel 122A, and the first wheel 122A is not driven to rotate unexpectedly when the user operates the second wheel 124A.

Figure 7:
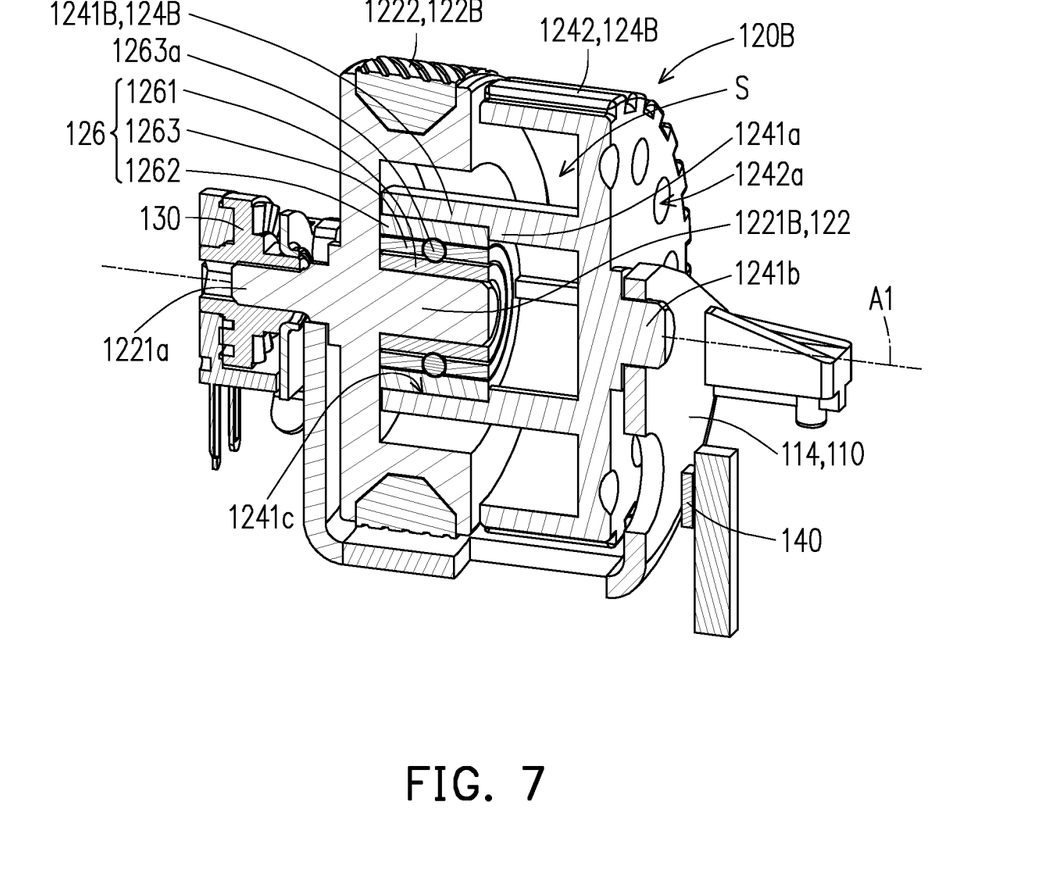
FIG. 7 is a cross-sectional view of a mouse according to another embodiment of the disclosure.

In the embodiment shown in FIG. 3, the first axle portion 1221 has a first pivot end 1221a and a second pivot end 1221b, and the wheel module 120 may be rotatably connected to the frame 114 of the mouse body 110 by the first pivot end 1221a and the second pivot end 1221b. Specifically, the first pivot end 1221a of the first axle portion 1221 is rotatably connected to the frame 114 and an encoder 130 of the mouse, and the second pivot end 1221b of the first axle portion 1221 is rotatably connected to the frame 114. However, the disclosure is not limited thereto. FIG. 7 is a cross-sectional view of a mouse according to another embodiment of the disclosure. Differences between the embodiment shown in FIG. 7 and the embodiment shown in FIG. 3 are that in a wheel module 120B of FIG. 7, a first axle portion 1221B of a first wheel 122B has the first pivot end 1221a, a second axle portion 1241B of a second wheel 124B has a second pivot end 1241b relative to the first pivot end 1221a, and the wheel module 120B is rotatably connected to the frame 114 in the mouse body 110 by the first pivot end 1221a and the second pivot end 1241b. Specifically, the first pivot end 1221a of the first axle portion 1221B is rotatably connected to the frame 114 and the encoder 130, and the second pivot end 1241b of the second axle portion 1241B is rotatably connected to the frame 114.

Figure 8:
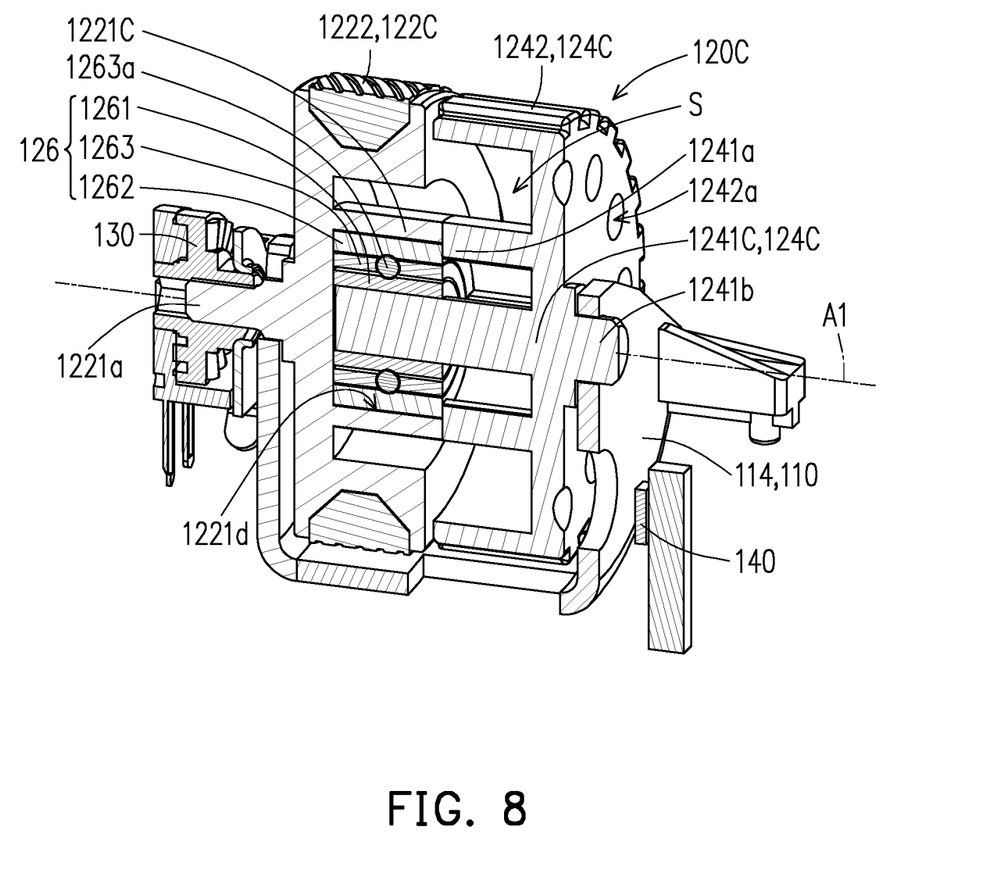
FIG. 8 is a cross-sectional view of a mouse according to another embodiment of the disclosure.

FIG. 8 is a cross-sectional view of a mouse according to another embodiment of the disclosure. Differences between the embodiment shown in FIG. 8 and the embodiment shown in FIG. 7 are that in a wheel module 120C of FIG. 8, the axle connecting assembly 126 is disposed around a second axle portion 1241C of a second wheel 124C, and a first axle portion 1221C of a first wheel 122C includes a hollow portion 1221d, the hollow portion 1221d extends from the inner wall of the first wheel portion 1222 and is sleeved on the axle connecting assembly 126, and the stop structure 1241a of the second axle portion 1241C partially overlaps the axle connecting assembly 126 in the axial direction (the direction parallel to the axis of rotation A1) of the axle connecting assembly 126, so as to stop the axle connecting assembly 126 at its position when the axle connecting assembly 126 unexpectedly separates from the hollow portion 1221d. That is, in the radial direction of the axis of rotation A1, the first axle portion 1221C, the axle connecting assembly 126, and the second axle portion 1241C are sequentially disposed from the outside to the inside. In the embodiment, there is, for example, a gap between the stop structure 1241a and the hollow portion 1221d, so as to prevent the generation of resistance due to the contact friction between the stop structure 1241a and the hollow portion 1221d when the first wheel 122C and the second wheel 124C rotate relative to each other.

The following describes an output signal mode of the wheel module according to the embodiment of the disclosure. As shown in FIG. 3, the mouse 100 (shown in FIG. 1) further includes the encoder 130. The encoder 130 is disposed in the mouse body 110 (shown in FIG. 1) and connected to the first axle portion 1221 of the first wheel 122, and is suitable for detecting the spinning of the first axle portion 1221. In addition, as shown in FIG. 3, the mouse 100 (shown in FIG. 1) further includes a non-contact sensor 140. The non-contact sensor 140 is, for example, an optical sensor, which is disposed in the mouse body 110 (shown in FIG. 1) and faces the second wheel 124, and is suitable for detecting the spinning of the second wheel 124. Specifically, the second wheel 124 may have multiple to-be-detected portions 1242a on its second wheel portion 1242. The to-be-detected portions 1242a may be recessed portions or other suitable forms, which are disposed around the axis of rotation A1 to be suitable for sequentially aligning with the optical sensor (the non-contact sensor 140) with the spinning of the second wheel 124. Therefore, the optical sensor may obtain an amount of the spins and a spinning speed of the second wheel 124 by detecting the to-be-detected portions 1242a. In other embodiments, the to-be-detected portions 1242a may be formed at other suitable positions of the second wheel 124, and the non-contact sensor 140 may be correspondingly disposed at other suitable positions to be suitable for detecting the to-be-detected portions 1242a.

Figure 9:
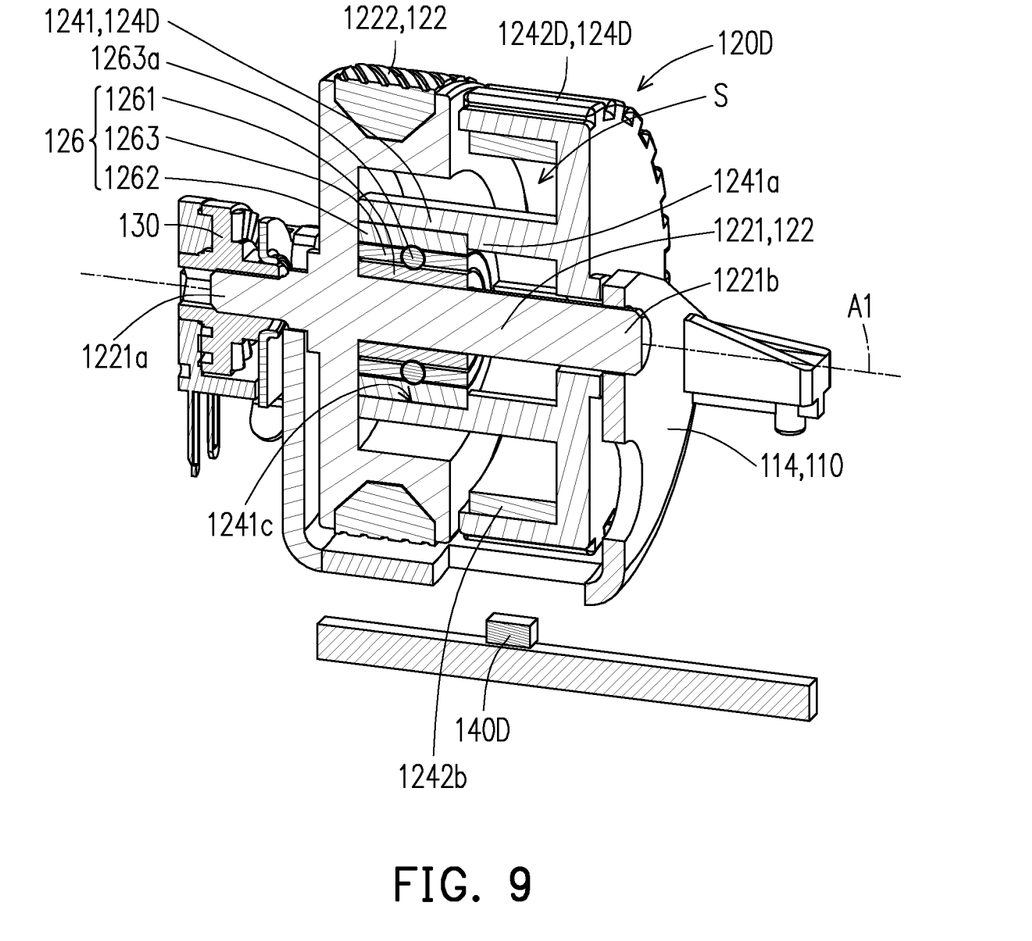
FIG. 9 is a cross-sectional view of a mouse according to another embodiment of the disclosure.

FIG. 9 is a cross-sectional view of a mouse according to another embodiment of the disclosure. A difference between the embodiment shown in FIG. 9 and the embodiment shown in FIG. 3 is that in a wheel module 120D of FIG. 9, a non-contact sensor 140D is a magnetic sensor, which may be a Hall sensor. The second wheel 124D may have multiple magnetic portions 1242b on its second wheel portion 1242D. The magnetic portions 1242b may be permanent magnets, which are disposed around the axis of rotation A1 in a polarized staggered manner to be suitable for sequentially aligning with the magnetic sensor (the non-contact sensor 140D) with spinning of the second wheel portion 1242D. Therefore, the magnetic sensor may obtain an amount of spins and a spinning speed of the second wheel 124D by detecting the magnetic portions 1242b. In other embodiments, the magnetic portions 1242b may be formed at other suitable positions of the second wheel 124D, and the non-contact sensor 140D may be correspondingly disposed at other suitable positions to be suitable for detecting the magnetic portion 1242b.

The embodiments shown in FIGS. 5 to 8 are illustrated as being disposed with the optical sensor (the non-contact sensor 140) shown in FIG. 3 and the corresponding to-be-detected portions 1242a. However, the disclosure is not limited thereto, and the optical sensor (the non-contact sensor 140) shown in FIGS. 5 to 8 and the corresponding to-be-detected portions 1242a may be replaced with the magnetic sensor (the non-contact sensor 140D) and the corresponding magnetic portions 1242b as shown in FIG. 9.

Figure 10:
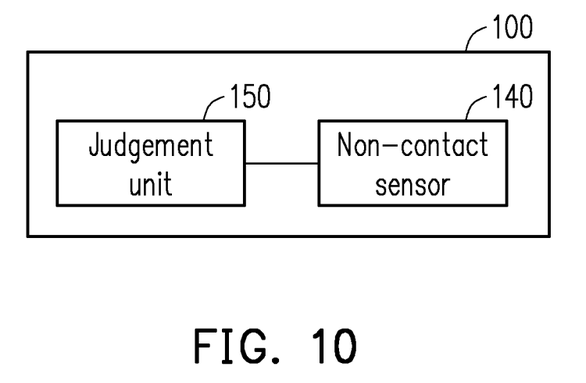
FIG. 10 is a block view of some components of the mouse in FIG. 1.

FIG. 10 is a block view of some components of the mouse in FIG. 1. With reference to FIG. 10, furthermore, the mouse 100 of the embodiment further includes a judgement unit 150. The judgement unit 150 is, for example, a judgement circuit disposed in the mouse body 110 (shown in FIG. 1) and coupled to the non-contact sensor 140. As the first wheel 122 is restricted by mechanical action mode of the encoder 130, it has a lower spinning speed, which enables the second wheel 124 that is rotated by the user in synchronization with the first wheel 122 to also have a smaller spinning speed when the user accidentally touches the second wheel 124 while operating the first wheel 122 and enables the second wheel 124 to rotate unexpectedly. Therefore, the non-contact sensor 140 will detect that the spinning speed of the second wheel 124 is less than a predetermined value and at this time, the judgment unit 150 determines that the spinning of the second wheel 124 is an error. In this way, it is possible to prevent the user from outputting unexpected signals due to accidentally touching the second wheel 124 while operating the first wheel 122. The judgement unit 150 may be applied to any of the embodiments shown in FIGS. 5 to 9.

Figure 11:
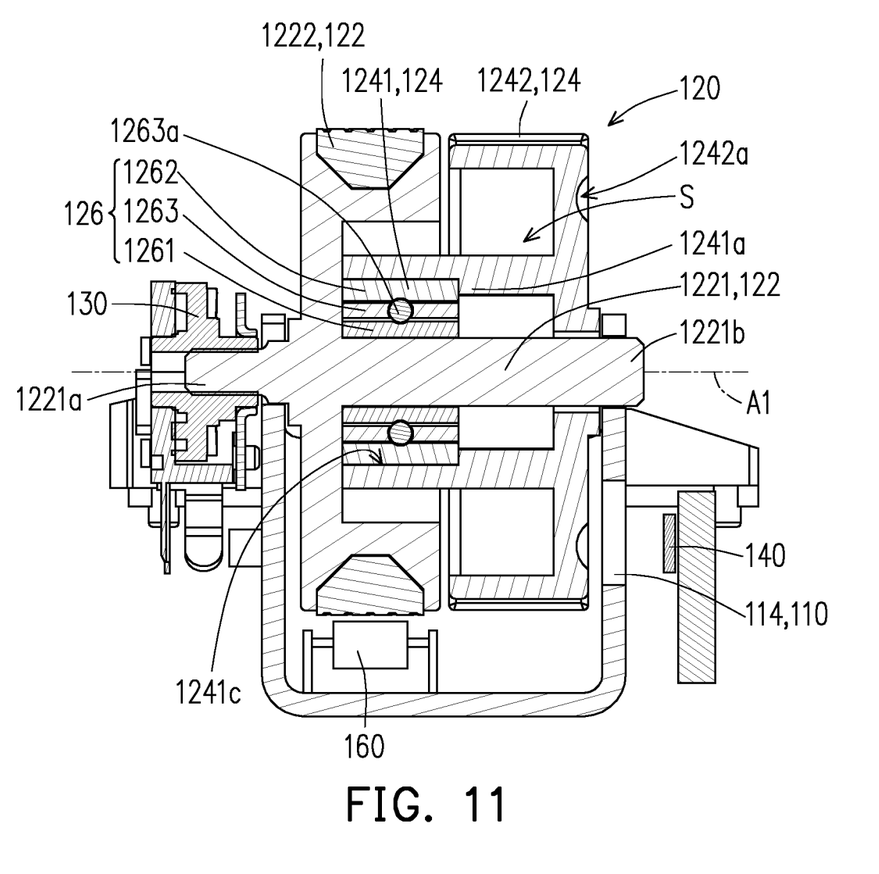
FIG. 11 is a schematic view of some components of a mouse according to another embodiment of the disclosure.

FIG. 11 is a schematic view of some components of a mouse according to another embodiment of the disclosure. A difference between the embodiment shown in FIG. 11 and the embodiment shown in FIG. 3 in that a mouse in the embodiment shown in FIG. 11 further includes a supporting member 160. The supporting member 160 is disposed in the frame 114 of the mouse body 110 and is suitable for supporting the first wheel 122 in the radial direction of the axis of rotation A1, so as to prevent damage to the wheel module 120 caused by downward pressure on the wheel module 120 by the user. Furthermore, the supporting member 160 may be an idler wheel, which is rotatably disposed on the frame 114. The generation of resistance due to contact with the supporting member 160 when the first wheel 122 is rotating may be prevented by a rotatable characteristic of the idler wheel (the supporting member 160).

Although the disclosure has been described with reference to the abovementioned embodiments, but it is not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A mouse, comprising:
   a mouse body; and
   a wheel module, comprising a first wheel, a second wheel and an axle connecting assembly, wherein the first wheel has a first axle portion, the second wheel has a second axle portion, the first wheel and the second wheel are respectively rotatably disposed on the mouse body along a same axis of rotation by the first axle portion and the second axle portion, the axle connecting assembly is connected to and in between the first axle portion and the second axle portion, and the first axle portion and the second axle portion rotate relative to each other by the axle connecting assembly,
   wherein the axle connecting assembly is disposed around one of the first axle portion and the second axle portion, the other of the first axle portion and the second axle portion comprises a hollow portion, and the hollow portion is sleeved on the axle connecting assembly.

2. The mouse according to claim 1, wherein the axle connecting assembly is a bearing.

3. The mouse according to claim 1, wherein the axle connecting assembly is a self-lubricating material.

4. The mouse according to claim 1, wherein the first axle portion has a first pivot end and a second pivot end relative to each other, and the wheel module is rotatably connected to the mouse body by the first pivot end and the second pivot end.

5. The mouse according to claim 1, wherein the first axle portion has a first pivot end, the second axle portion has a second pivot end relative to the first pivot end, and the wheel module is rotatably connected to the mouse body by the first pivot end and the second pivot end.

6. The mouse according to claim 1, wherein the first wheel has a first wheel portion, the second wheel has a second wheel portion, the first wheel portion and the second wheel portion form an accommodation space together, and the first axle portion and the second axle portion are respectively connected to the first wheel portion and the second wheel portion, and are at least partially located in the accommodation space.

7. The mouse according to claim 1, wherein the first wheel has a first wheel portion, the second wheel has a second wheel portion, the first axle portion and the second axle portion are respectively connected to the first wheel portion and the second wheel portion, and the first wheel portion and the second wheel portion are sequentially arranged in a direction parallel to the axis of rotation.

8. The mouse according to claim 1, wherein the first wheel has a first wheel portion, the second wheel has a second wheel portion, the first axle portion and the second axle portion are respectively connected to the first wheel portion and the second wheel portion, and the axle connecting assembly is aligned with the first wheel portion or the second wheel portion.

9. The mouse according to claim 1, wherein the mouse body comprises a main casing and a frame, the frame is disposed in the main casing, and at least one of the first axle portion and the second axle portion is rotatably connected to the frame.

10. The mouse according to claim 9, wherein the frame is deflectably connected to the main casing.

11. The mouse according to claim 1, further comprising:
    an encoder, wherein the encoder is disposed in the mouse body and connected to the first axle portion, and is suitable for detecting spinning of the first axle portion.

12. The mouse according to claim 1, further comprising:
    a non-contact sensor, wherein the non-contact sensor is disposed in the mouse body and faces the second wheel, and is suitable for detecting spinning of the second wheel.

13. The mouse according to claim 12, wherein the non-contact sensor is an optical sensor, the second wheel has a plurality of to-be-detected portions, and the to-be-detected portions are disposed around the axis of rotation to be suitable for sequentially aligning with the optical sensor with the spinning of the second wheel.

14. The mouse according to claim 13, wherein the to-be-detected portions comprise a plurality of recessed portions.

15. The mouse according to claim 12, wherein the non-contact sensor is a magnetic sensor, the second wheel has a plurality of magnetic portions, and the magnetic portions are disposed around the axis of rotation to be suitable for sequentially aligning with the magnetic sensor with the spinning of the second wheel.

16. The mouse according to claim 15, wherein the magnetic portions comprise a plurality of permanent magnets.

17. The mouse according to claim 12, further comprising:
    a judgement unit, wherein the judgement unit is disposed in the mouse body and coupled to the non-contact sensor, and the judgement unit determines that the spinning of the second wheel is an error when a spinning speed of the second wheel is detected by the non-contact sensor to be less than a predetermined value.

18. The mouse according to claim 1, further comprising:
    a supporting member, wherein the supporting member is disposed in the mouse body and is suitable for supporting the first wheel in a radial direction of the axis of rotation.

19. The mouse according to claim 18, wherein the supporting member comprises an idler wheel, and the idler wheel is rotatably disposed in the mouse body.

* * * * *